Nov. 6, 1962     N. A. STROUD     3,061,968
LIVE BAIT HOOK
Filed Feb. 3, 1961

Nolan A. Stroud
INVENTOR.

BY *Clarence A. O'Brien*
*and Harvey B. Jacobson*
Attorneys 3,061,968
LIVE BAIT HOOK
Nolan A. Stroud, 1701 Cottonwood St., Abilene, Tex.
Filed Feb. 3, 1961, Ser. No. 86,990
5 Claims. (Cl. 43—44.8)

This invention relates to an improved live bait hook which is readily applicable to the shank of a conventional-type fishhook and which is expressly designed and effectively adapted to securely hold and position the live bait in proximity to the curvate barbed bend of the fishhook.

An object of the invention is to provide a relatively small live bait hook which is such in construction that it serves to reliably locate and positively fasten the live minnow (perch or small fish) on the fishhook's shank advantageously close to the barbed hook on said shank, which serves to keep the bait alive longer than other bait hooks, and functions well whether used on hooks for rod and reel, hand-thrown lines or trot lines, as the case may be.

In carrying out a preferred embodiment of the invention a bait hook of unique construction is utilized. To this end the hook is fashioned from a length of steel wire which is bent upon itself in a special way to provide the desired facilities. More explicitly, the wire is bent to provide a suitably shaped and angled miniature barbed hook at the lower end of a shank. The shank, in turn, is formed with predetermined lateral bends; namely, an approximately circular bend or bent portion at the upper end defining a resilient C-clip, and a novel clasp-like gripper, or gripper means, at the median portion of the shank. This gripper means comprises a pair of complemental semi-circular resilient jaws one above the other. These jaws are properly related to each other, the shank portion, and also C-clip whereby to enable the user to readily snap the bait hook, as a unit, on the shank of the fishhook readied for reception and retention of the live minnow.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
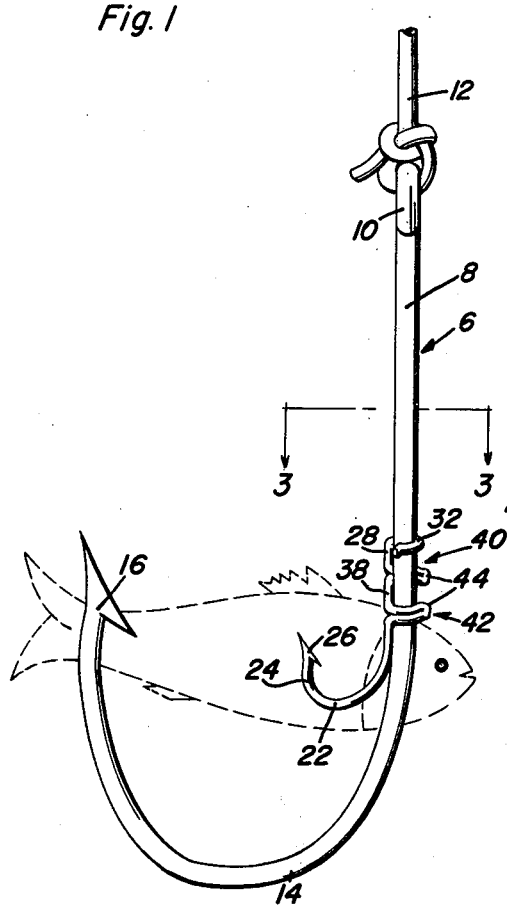
FIG. 1 is a view in side elevation showing a conventional type fishhook, the improved live bait hook, and the manner in which the bait hook is expressly constructed and applied on the shank of the fishhook for use.
Figure 3:
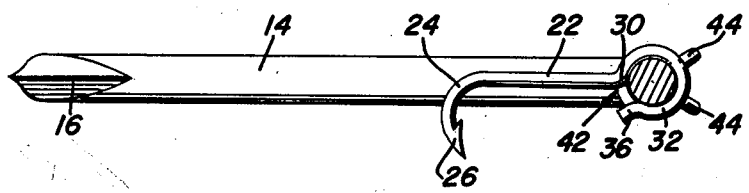
FIG. 3 is a view somewhat larger than FIG. 1 showing the attached live bait hook, this view being a section on the line 3—3 of FIG. 1.

With reference to FIGS. 1 and 3 the fishhook is denoted by the numeral 6 and is represented as a large or heavy duty hook and embodies a substantially linearly straight shank 8 having a line eye 10 at the top to which the fishing line 12 is suitably connected. The usual arcuate or curvate bend 14 is provided at the lower end and terminates in a suitable barb 16.

Figure 2:
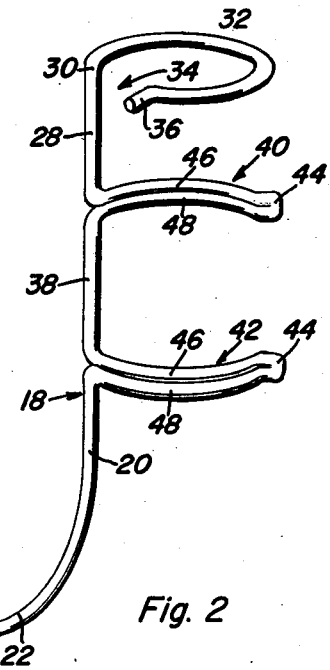
FIG. 2 is a view in side elevation of the live bait hook on a large scale.

The readily attachable and detachable live bait hook is made of steel wire and is fashioned from a single length of wire and is characterized by a shank 18 which is of the three-part construction shown best in FIGS. 1 and 2. The lower generally straight portion 20 of the shank is provided with an arcuate or curving bent portion 22 having a laterally offset terminal bend 24 terminating in a suitable barb 26. The upper portion 28 of this shank 18 is laterally bent as at 30 and is then bent upon itself into general circular form (see FIG. 3) and defines an attaching and retaining clip 32. This clip is of desired springy or resilient form and is sometimes referred to as a split or C-shaped clip whose open portion 34 is off to one side of the shank portion 28 and terminates in an outwardly flared tip 36 which facilitates applying and removing the clip. The part of the wire which defines a median or intermediate shank portion 38 is provided on the same side as the clip 32 with attaching and retaining gripper or gripping means sometimes referred to as a resilient clasp. This means comprises upper and lower generally semi-circular jaws 40 and 42 with the jaw 40 embracing one side of the shank 8 as shown in FIG. 1 and the jaw 42 embracing the diametrically opposite side of the shank 8. The free tip portions 44 are flared outwardly in opposite directions as best shown in FIG. 3 to facilitate snapping the jaws into place on the shank 8. Each jaw embodies components 46 and 48 of the wire which is doubled upon itself in the manner shown with the return-bends of the wire defining the flared guides 44.

Experience of anglers has shown that if a live minnow or an equivalent live bait is too severely pierced with a hook, particularly a large barbed hook, the minnow soon dies. On the other hand experience with the instant miniature hook means 22, 24 and 26 has shown that the bait is not only securely anchored but the life thereof is prolonged and the effectiveness of the bait is increased in proportion to the extended life period.

In practice the live bait hook is snapped into position on the shank 8 in the manner illustrated in FIG. 1. Obviously, and because of the unique construction of the C-shaped clip 32 and the jaws 40 and 42 the hook, as an entity, is readily snapped into position and equally well removed. In fact with the attaching and retaining means herein shown the angler may apply the bait hook closer to or farther from the bend 14 depending on the size of the bait which is being used. The phantom line shown in FIG. 1 is merely to illustrate how a minnow may be attached and used. In most instances however the live bait hook would be shifted down on the shank 8 so that the ventral or belly portion of the minnow would be in close proximity to the bend 14, that is, much more so than is illustrated in FIG. 1. It may be added that the showing in FIG. 1 is not intended to give the impression that the large barb 16 is in any way used to pierce the minnow. In other words the minnow is supported entirely on the barb and its bent portions 24 and 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on a fishhook which embodies a shank with a line eye at one end and a barbed hook at the other end, a readily applicable and removable live bait hook formed from a single length of steel wire and comprising a shank having a barbed bait hook at a lower end of the shank, a laterally extending resilient clip at the upper end of said shank, and snap-on gripper means embodied in and integral with the median portion of said shank, said gripper means embodying a pair of longitudinally spaced companion resilient jaws which also extend laterally to said shank, said jaws being located below said clip and being approximately semi-circular in plan and having free terminal outwardly flared tip portions to facilitate the step of guiding the jaws into an intended place and position on the shank of the fishhook.

2. For use on a fishhook which embodies a shank with a line eye at one end and a barbed hook at the other end, a readily applicable and removable live bait hook comprising a shank having a barbed bait hook at a lower end of the shank, the upper end of said shank having an approximately circular bend projecting at an angle lateral to the longitudinal axis of one side of said shank with a free outwardly flared tip terminating adjacent to but spaced from said shank and defining a resilient attaching and retaining clip substantially C-shaped in plan, and gripper means integral with the median portion of said shank and embodying a pair of upper and lower vertically spaced jaws, said jaws being resilient and projecting laterally beyond said one side of said shank.

3. The structure defined in claim 2 and wherein said jaws are approximately semi-circular in plan and have free terminal outwardly flared tip portions constituting guides for said jaws.

4. In combination, a fishhook embodying a shank having a line eye at one end and a curvate bend terminating in a barb at its other end, and a relatively small live bait hook having a shank provided at an upper end with a laterally directed spring-clip yieldingly but releasably embracing the fishhook's shank and positioning the bait hook's shank contiguous thereto, said last named shank having a curvate bend spaced from but opposed to the first named curvate bend and terminating in a lateral bent portion provided with a barb, the median portion of the shank of said bait hook having upper and lower laterally projecting jaws also releasably embracing the fishhook shank, said clip being C-shaped in plan and said jaws being approximately semi-circular in plan.

5. A live bait hook comprising a shank having a curved bent portion at one end with a lateral bend at a free end terminating in a barb, the latter being offset relative to the lengthwise axis of the shank, a median portion of said shank being bent upon itself and fashioned into upper and lower longitudinally spaced attaching and gripping jaws, and a C-shaped attaching clip at the upper end of the shank.

References Cited in the file of this patent
UNITED STATES PATENTS

| | | |
|---|---|---|
| 740,416 | Gebhardt | Oct. 6, 1903 |
| 2,087,369 | Woodring | July 20, 1937 |
| 2,115,493 | Kosten | Apr. 26, 1938 |
| 2,564,216 | Stark | Aug. 14, 1951 |
| 2,932,116 | Woodzick | Apr. 12, 1960 |